United States Patent
Yano

(10) Patent No.: US 9,673,442 B2
(45) Date of Patent: Jun. 6, 2017

(54) METHOD OF MANUFACTURING MEMBRANE ELECTRODE ASSEMBLY

(71) Applicant: TOYOTA JIDOSHA KABUSHIKI KAISHA, Toyota-shi, Aichi-ken (JP)

(72) Inventor: Shimpei Yano, Kasugai (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/957,717

(22) Filed: Dec. 3, 2015

(65) Prior Publication Data
US 2016/0164068 A1   Jun. 9, 2016

(30) Foreign Application Priority Data

Dec. 8, 2014 (JP) ................. 2014-247701

(51) Int. Cl.
| | |
|---|---|
| B32B 41/00 | (2006.01) |
| H01M 4/04 | (2006.01) |
| H01M 8/1004 | (2016.01) |
| H01M 4/88 | (2006.01) |

(52) U.S. Cl.
CPC ......... H01M 4/043 (2013.01); H01M 4/0471 (2013.01); H01M 4/8882 (2013.01); H01M 8/1004 (2013.01); Y02P 70/56 (2015.11)

(58) Field of Classification Search
CPC ............................ H01M 4/043; H01M 4/0471
USPC .................................. 156/64, 350, 378, 379
See application file for complete search history.

(56) References Cited

U.S. PATENT DOCUMENTS

| | | | |
|---|---|---|---|
| 2008/0274387 A1 | 11/2008 | Hori et al. | |
| 2011/0201155 A1* | 8/2011 | Kuroda | ............... H01L 21/4853 438/113 |

FOREIGN PATENT DOCUMENTS

| | | |
|---|---|---|
| JP | 07-029576 | 1/1995 |
| JP | 2004-288391 | 10/2004 |
| JP | 2005-050734 | 2/2005 |
| JP | 2006-286560 A | 10/2006 |
| JP | 2010-061865 | 3/2010 |
| JP | 2011-258397 A | 12/2011 |
| JP | 2012-209268 | 10/2012 |
| JP | 2014-060167 | 4/2014 |
| WO | WO 2014/155929 A1 | 10/2014 |

* cited by examiner

*Primary Examiner* — Michael N Orlando
*Assistant Examiner* — Joshel Rivera
(74) *Attorney, Agent, or Firm* — Finnegan, Henderson, Farabow, Garrett & Dunner, LLP

(57) ABSTRACT

Provided is a method of manufacturing a membrane electrode assembly in which an electrode catalyst layer is formed on a surface of an electrolyte membrane. This method includes: a drying of drying a substrate sheet to which a catalyst ink is applied, the catalyst ink containing catalyst support particles on which a catalytic metal is supported, a solvent, and an ionomer; and a heat treatment of performing a heat treatment on the substrate sheet, on which the catalyst ink is dried, after the drying at a heat treatment temperature which is equal to or higher than a glass transition temperature of the ionomer to prepare the electrode catalyst layer. The heat treatment is performed after a concentration of a solvent gas obtained by gasification of the solvent, which remains in a chamber of a heating device for performing the heat treatment, is a predetermined concentration threshold or lower.

5 Claims, 7 Drawing Sheets

FIG. 3
DRYING <S200>
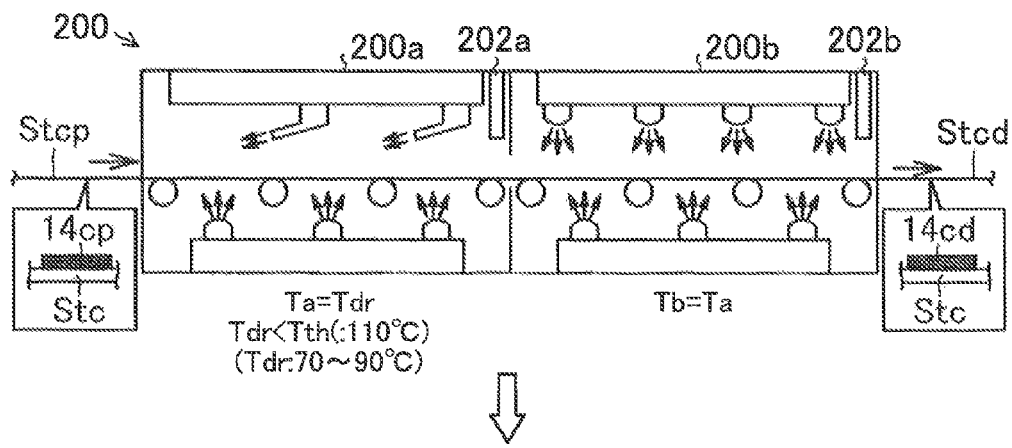
SOLVENT GAS REMOVAL VERIFICATION <S300>
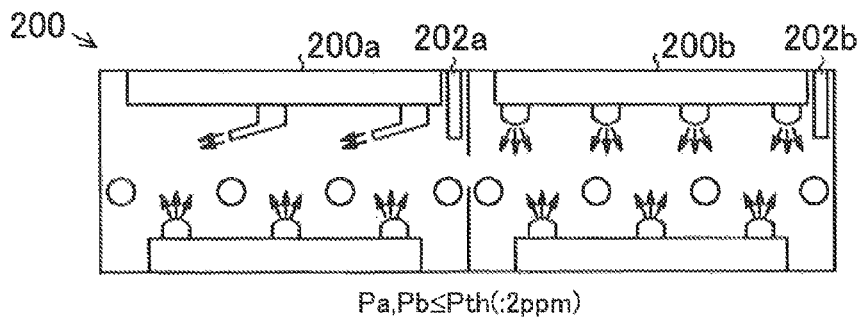
HEAT TREATMENT <S400>
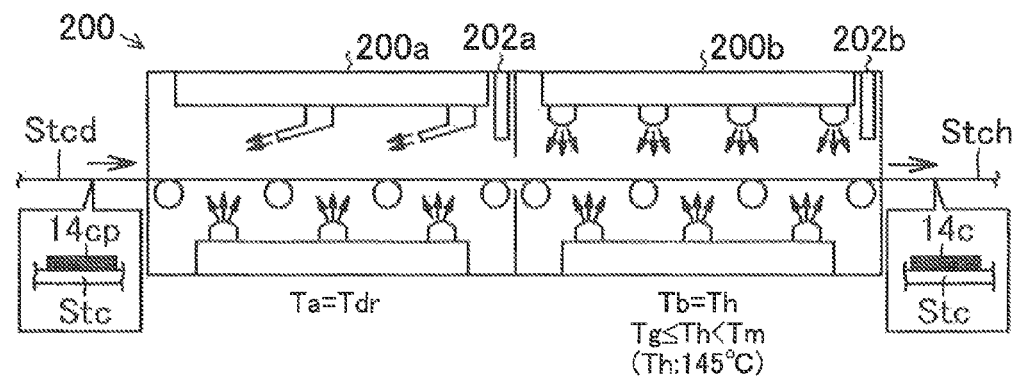

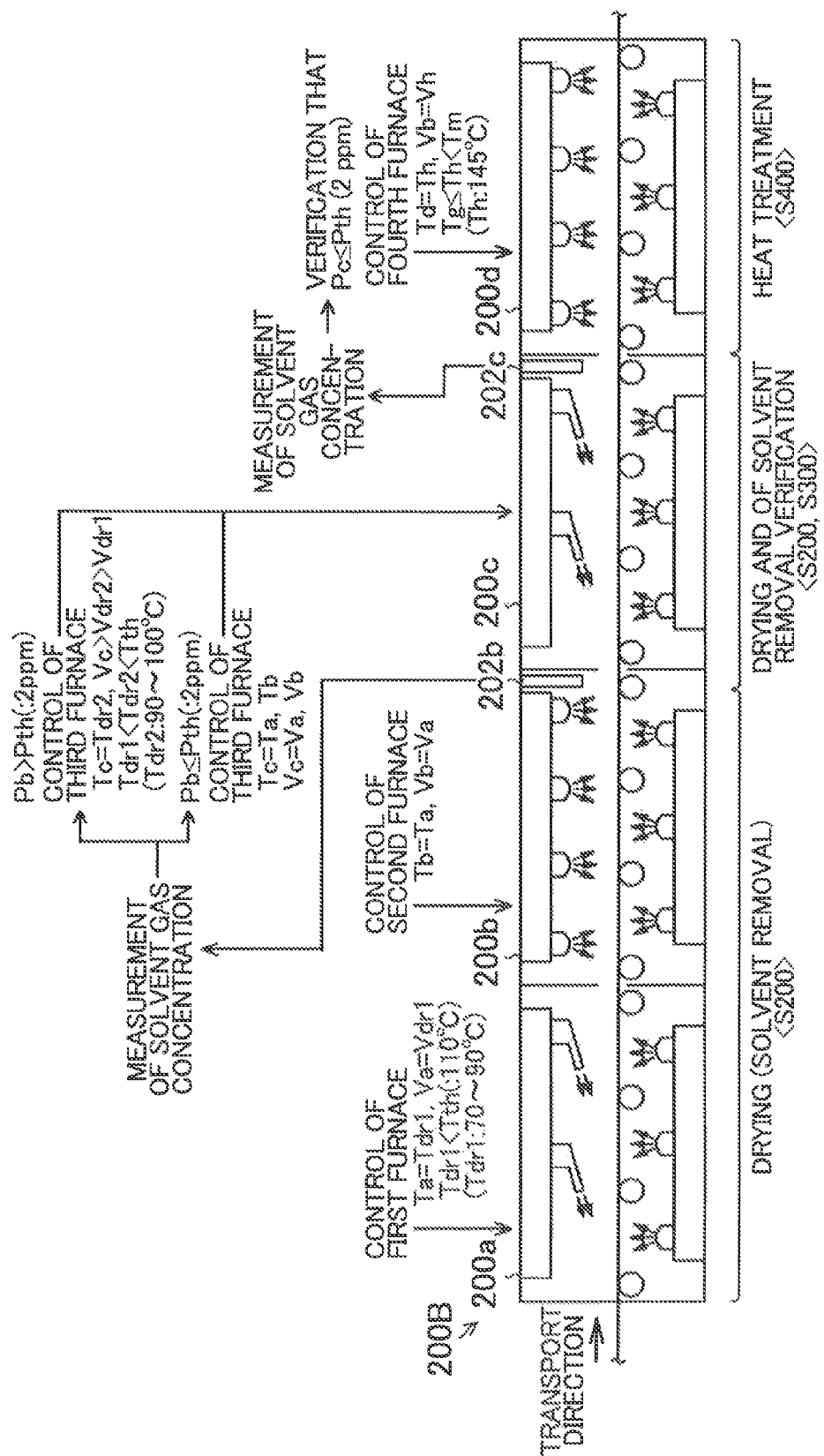

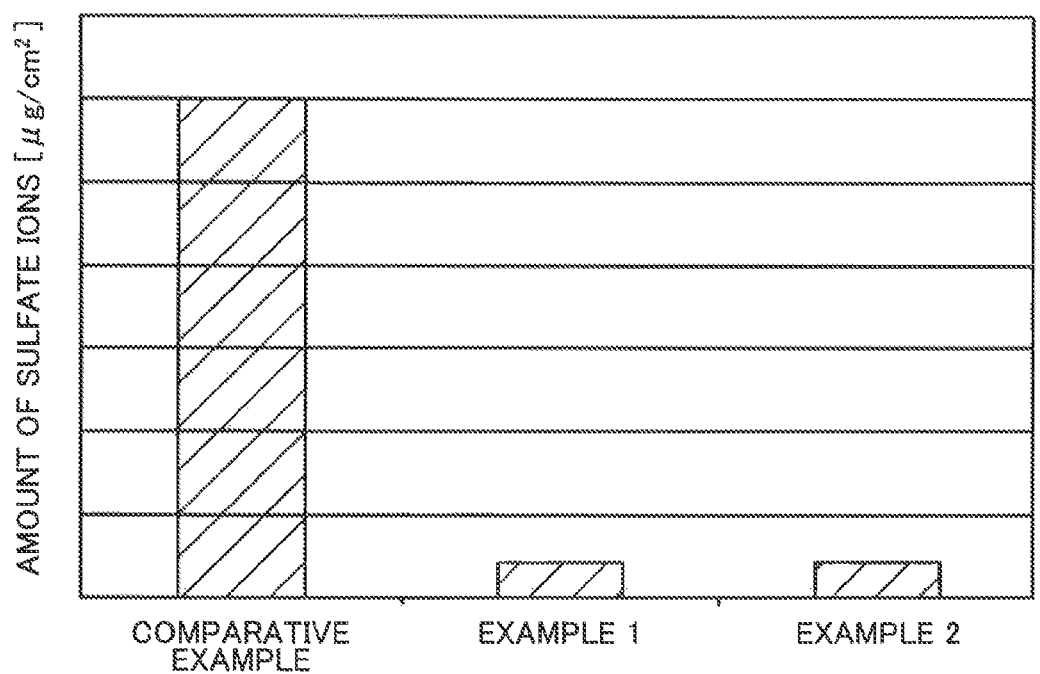

METHOD OF MANUFACTURING MEMBRANE ELECTRODE ASSEMBLY

INCORPORATION BY REFERENCE

The disclosure of Japanese Patent Application No, 2014-247701 filed on Dec. 8, 2014 including the specification, drawings and abstract is incorporated herein by reference in its entirety.

BACKGROUND OF THE INVENTION

1. Field of the Invention

The present invention relates to a method of manufacturing a membrane electrode assembly.

2. Description of Related Art

A membrane electrode assembly (MEA) used in a fuel cell is a power generation unit in which an electrode catalyst layer is formed on both surfaces of an electrolyte membrane. Various methods for manufacturing this membrane electrode assembly have been disclosed.

For example, Japanese Patent Application Publication No. 2004-288391 (JP 2004-288391 A) describes a method of manufacturing a membrane electrode assembly, the method including: preparing a transfer sheet on which an electrode catalyst layer is formed by applying a catalyst ink to the transfer sheet; drying the prepared transfer sheet to remove a solvent; performing a heat treatment on the dried transfer sheet; and transferring the heat-treated transfer sheet to an electrolyte membrane.

Japanese Patent Application Publication No. 2012-209268 (JP 2012-209268 A) describes a method including: forming an electrode catalyst layer by applying a catalyst layer-forming mixture (catalyst ink) to an electrolyte membrane and drying the catalyst layer-forming mixture; and performing a heat treatment on the formed electrode catalyst layer in a temperature range of 40° C. to a glass transition temperature of an electrolyte resin (cation exchange resin, ionomer), which is contained in the electrode catalyst layer, in order to remove organic materials such as alcohol from the electrode catalyst layer.

Japanese Patent Application Publication No. 7-29576 (JP 7-29576 A) describes a method including: drying an alcohol solvent to be removed from a catalyst paste when the catalyst paste is applied to a gas supply layer (porous sheet) and dried.

Japanese Patent Application Publication No. 2014-60167 (JP 2014-60167 A) describes a method including: preparing a catalyst layer transfer sheet on which an electrode catalyst layer is formed by applying a catalyst paste to a substrate sheet and drying the catalyst paste; and maintaining a high-temperature state of a glass transition temperature of the electrolyte membrane±50° C. when the electrode catalyst layer is transferred to a surface of the electrolyte membrane to peel the substrate sheet by applying pressure to the electrolyte membrane while heating the catalyst layer transfer sheet, thereby suppressing peeling defects of the electrode catalyst layer.

Japanese Patent Application Publication No. 2010-61865 OP 2010-61865 A) describes a method including: preparing a substrate sheet on which an electrode catalyst layer is formed by applying an ink composition (catalyst ink) to the substrate sheet and drying the ink composition; and performing a heat treatment on the formed electrode catalyst layer at a temperature which is higher than a glass transition temperature of an ionomer (electrolyte resin, ion exchange resin) in the electrode catalyst layer, thereby improving the strength of a structure of the electrode catalyst layer.

Japanese Patent Application Publication No. 2005-50734 (JP 2005-50734 A) discloses a method including: performing a heat treatment on a sheet of a mixture of carbon particles and a cation exchange resin (electrolyte resin, ionomer) in a temperature range of a glass transition temperature of the cation exchange resin to a decomposition temperature thereof, thereby improving the strength of a structure of a catalyst electrode layer, for example, improving the stability of a crystal structure of the cation exchange resin or the adhesion between surfaces of the carbon particles and the cation exchange resin.

The present inventors found the following problems regarding the related art. That is, for example, in JP 2004-288391 A, alcohol gas is produced by evaporating alcohol (for example, ethanol or propanol) as a solvent during the drying of the transfer sheet. When the heat treatment is performed on the electrode catalyst layer in an environment in which the produced alcohol gas remains, the alcohol gas is oxidized through an oxidation reaction caused by the catalyst in the electrode catalyst layer. For example, ethanol is converted into acetic acid, and oxidation heat is generated. The generation of oxidation heat causes the thermal decomposition of the ionomer in the electrode catalyst layer. For example, when the ionomer is a fluororesin (for example, "Nafion" (trade name)) which is a polymer having a sulfonic acid group ($-SO_3H$) at a terminal group thereof, the amount of sulfate ions ($So_4^{2-}$) contained in the electrode catalyst layer increases by the sulfonic acid group being thermally decomposed due to the oxidation heat. An increase in the amount of sulfate ions contained in the electrode catalyst layer decreases pH in a cell of a fuel cell, more specifically, pH in a membrane electrode assembly constituting the cell and causes the environment to be acidic, and poisoning of the electrode catalyst layer occurs. As a result, a decrease in the proton conductivity (cation conductivity) of the electrode catalyst layer, an increase in the impedance of an electrode including the electrode catalyst layer and a gas diffusion layer, or a decrease in the output of power generation of a fuel cell may occur.

The techniques disclosed in JP 2004-288391 A, JP 2012-209268 A, JP 7-29576 A, JP 2014-60167 A, JP 2010-61865 A, and JP 2005-50734 A do not describe the following point that: sulfate ions produced in the process of forming the electrode catalyst layer cause poisoning of the electrode catalyst layer even in the initial stage of a fuel cell (membrane electrode assembly), which may cause a decrease in the proton conductivity of the electrode catalyst layer, an increase in the impedance of an electrode including the electrode catalyst layer and a gas diffusion layer, or a decrease in the output of power generation of a fuel cell.

SUMMARY OF THE INVENTION

The invention can realize the following configurations.

(1) According to a first aspect of the invention, there is provided a method of manufacturing a membrane electrode assembly in which an electrode catalyst layer is formed on a surface of an electrolyte membrane. This method of manufacturing a membrane electrode assembly includes: a drying step of drying a substrate sheet to which a catalyst ink is applied, the catalyst ink containing catalyst support particles on which a catalytic metal is supported, a solvent, and an ionomer; a heat treatment step of performing a heat treatment on the substrate sheet, on which the catalyst ink is dried, after the drying step at a heat treatment temperature which is equal to or higher than a glass transition temperature of the ionomer to prepare the electrode catalyst layer; and a thermocompression bonding step of bonding the prepared electrode catalyst layer to the electrolyte membrane through thermocompression bonding to prepare the membrane electrode assembly. In the heat treatment step, the heat treatment is performed after a concentration of a solvent gas obtained by gasification of the solvent, which remains in a chamber of a heating device for performing the heat treatment, is a predetermined concentration threshold or lower. In the method of manufacturing a membrane electrode assembly according to the aspect, the heat treatment is performed in the environment in which the concentration of the solvent gas is the predetermined concentration threshold or lower. Therefore, the generation of oxidation heat generated by an oxidation reaction of the solvent gas can be suppressed, and the thermal decomposition of the ionomer in the electrode catalyst layer can be suppressed. As a result, when the ionomer is a polymer having a sulfonic acid group at a terminal group thereof, the production of sulfate ions, which is caused by the sulfonic acid group being thermally decomposed due to the oxidation heat, can be suppressed.

(2) In the method of manufacturing a membrane electrode assembly according to the aspect, during the heat treatment step, a concentration of the solvent gas, which remains in a chamber of the heating device used for the drying step may be measured after the drying step, and after it is verified that the measured concentration of the solvent gas is the concentration threshold or lower, the heat treatment in the heat treatment step may be performed using the heating device in which the concentration of the solvent gas is the concentration threshold or lower. In the method of manufacturing a membrane electrode assembly according to the aspect, the heat treatment step can be performed in the environment in which the concentration of the solvent gas is the concentration threshold or lower. Since the heating device used as the drying device can be used as the heat treatment device, the size of manufacturing facilities can be reduced.

(3) In the method of manufacturing a membrane electrode assembly according to the aspect, the heating device may include a drying device for the drying step, a heat treatment device for the heat treatment step, and a drying adjusting device arranged between the drying device and the heat treatment device, the drying may be performed by the drying device during the heat treatment, a drying state of the catalyst ink may be adjusted by the drying adjusting device based on the concentration of the solvent gas at a terminal position in a chamber of the drying device, and the heat treatment in the heat treatment step may be performed by the heat treatment device after it is verified that the concentration of the solvent gas at a terminal position in a chamber of the drying adjusting device is the concentration threshold or lower. In the method of manufacturing a membrane electrode assembly according to the aspect, the heat treatment step can be performed in the environment in which the concentration of the solvent gas is the concentration threshold or lower. In addition, the drying step, the step of adjusting the drying state and verifying the concentration of the solvent gas, and the heat treatment step are sequentially performed using the drying device, the drying adjusting device, and the heat treatment device. Therefore, the size of manufacturing facilities increases, but the manufacturing efficiency can be improved.

In the method of manufacturing a membrane electrode assembly according to the aspect, during the drying, a drying temperature may be set as a temperature which is lower than a glass transition temperature of the ionomer and lower than a threshold temperature at which the ionomer is thermally decomposed.

In the method of manufacturing a membrane electrode assembly according to the aspect, the concentration threshold may be set by obtaining a relationship between the concentration of the solvent gas and the amount of sulfate ions, which are produced when the electrode catalyst layer is heated at the heat treatment temperature, in advance through an experiment to obtain a concentration of the solvent gas corresponding to an allowable amount of sulfate ions.

The invention can be realized in various forms of manufacturing methods including: a method of manufacturing a membrane electrode assembly in which an electrode catalyst layer is formed on a surface of an electrolyte membrane; a method of manufacturing a membrane electrode assembly in which a gas diffusion layer is further formed in addition to the electrode catalyst layer (also referred to as "membrane-electrode-gas diffusion layer assembly"); and a method of manufacturing a fuel cell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a diagram showing a heating device for heating an electrode catalyst layer sheet;

FIG. 6 is a diagram showing a heating device for heating an electrode catalyst layer sheet according to a second embodiment; and FIG. 7 is a diagram showing the results of comparing the amounts of sulfate ions contained in electrode catalyst layers according to Examples and Comparative Example.

DETAILED DESCRIPTION OF EMBODIMENTS

A. First Embodiment

Figure 1:
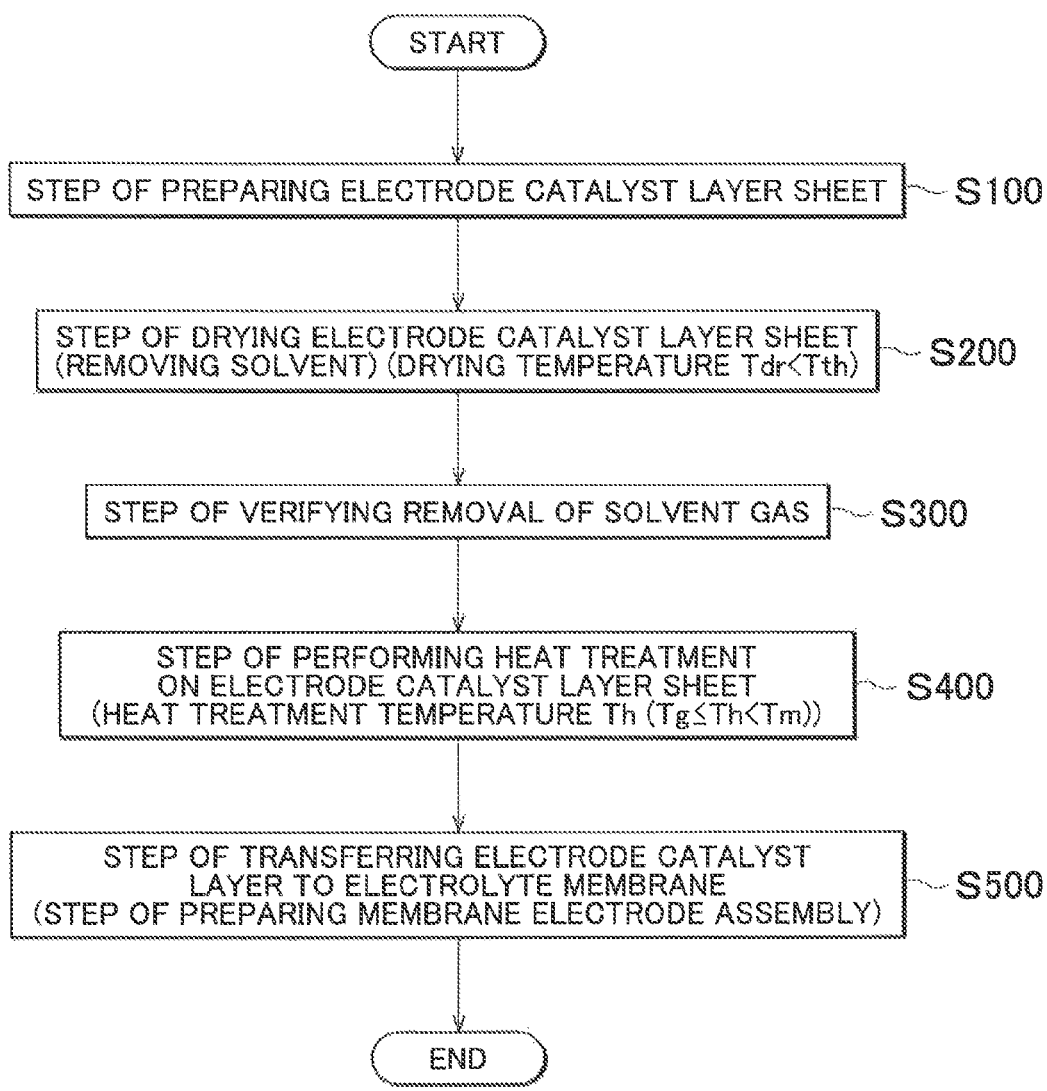
FIG. 1 is a flowchart showing a method of manufacturing a membrane electrode assembly according to a first embodiment.

FIG. 1 is a flowchart showing a method of manufacturing a membrane electrode assembly according to a first embodiment. As described below, a membrane electrode assembly (MEA) is prepared through the following steps including: a step of preparing an electrode catalyst layer sheet (Step S100); a step of drying the electrode catalyst layer sheet (Step S200); a step of verifying removal of a solvent gas (Step S300); a step of performing a heat treatment on the electrode catalyst layer sheet (Step S400); and a step of transferring the electrode catalyst layer to an electrolyte membrane (Step S500).

In Step S100, an electrode catalyst layer sheet in which a coating layer of a catalyst ink is formed on a substrate sheet is prepared. Specifically, in a membrane electrode assembly of a fuel cell, two electrode catalyst layer sheets are prepared which include a cathode catalyst layer sheet for preparing a cathode catalyst layer and an anode catalyst layer sheet for preparing an anode catalyst layer. A cathode catalyst ink is used for the preparation of the cathode catalyst layer sheet, and an anode catalyst ink is used for the preparation of the anode catalyst layer sheet. When it is not necessary to distinguish a cathode and an anode from each other, the cathode catalyst layer sheet and the anode catalyst layer sheet will also be referred to as "electrode catalyst layer sheet", and the cathode catalyst ink and the anode catalyst ink will also be referred to simply as "catalyst ink".

For example, the catalyst ink can be prepared (adjusted) as follows. Catalyst support particles are prepared and mixed with water (ion exchange water), one or more hydrophilic solvents (hereinafter, also referred to as "solvent") such as ethanol and propanol are added, and then an ionomer is prepared and added. The components are mixed with each other to obtain a mixture, and this mixture is dispersed using, for example, an ultrasonic homogenizer or a bead mill. As a result, the catalyst ink can be prepared. However, the preparation method is not limited to this method, and the catalyst ink can also be prepared using various general methods. Typically, the concentration of a catalyst contained in the cathode catalyst ink is higher than that in the anode catalyst ink.

For example, the catalyst support particles can be prepared as follows. Conductive support particles for supporting a catalytic metal are dispersed in a solution of the catalytic metal, and then catalyst support particles are prepared from the obtained dispersion using, for example, an impregnation method, a coprecipitation method, or an ion exchange method. The support particles can be selected from various carbon particles (carbon powders). For example, carbon black or carbon nanotube can be used. As the catalytic metal, platinum or a platinum compound (for example, a cobalt-platinum alloy or a platinum-nickel alloy) can be used. As the ionomer for the electrode catalyst layer, a proton-conductive electrolyte material having a sulfonic acid group at a terminal group thereof is used. In this example, as in the case of the electrolyte membrane, Nafion is used. However, the preparation method is not limited to this method, and the catalyst support particles can also be prepared using various general methods.

The electrode catalyst layer sheet can be prepared using an application device which applies the catalyst ink to the substrate sheet.

Figure 2:
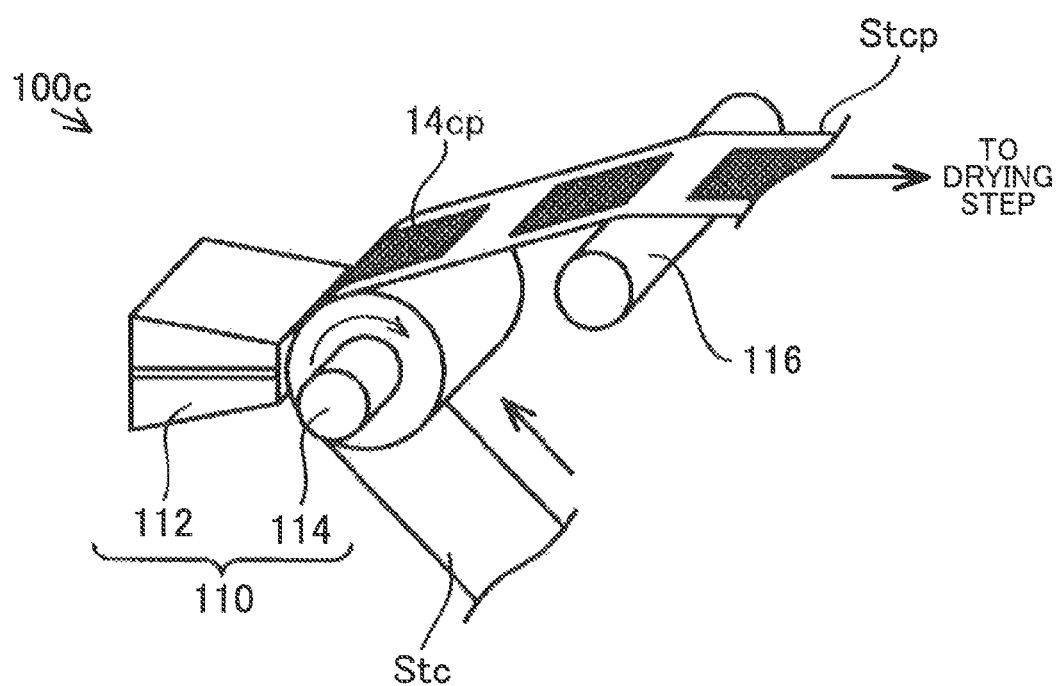
FIG. 2 is a diagram showing an example of an application device for applying a catalyst ink.

FIG. 2 is a diagram showing an example of the application device used for the preparation of the electrode catalyst layer sheet to which the catalyst ink is applied. An application device 100c is an example of the application device used for the preparation of the cathode catalyst layer sheet and includes a die coater 110 and a transport roller 116.

A belt-shaped substrate sheet Stc transported from a support roller (not shown) is supplied between a die 112 and a back-up roller 114 in the die coater 110. In the die coater 110, the cathode catalyst ink is ejected from a slit of the die 112 and is applied to the substrate sheet Stc to form a coating layer of the catalyst ink, that is, a non-dried cathode catalyst layer 14cp. The non-dried cathode catalyst layer 14cp is intermittently formed on the substrate sheet Stc. An interval at which the non-dried cathode catalyst layer 14cp is formed is basically set as a regular interval including a tolerance.

A cathode catalyst layer sheet Stcp on which the non-dried cathode catalyst layer 14cp is formed (hereinafter, also referred to as "non-dried cathode catalyst layer sheet Stcp") is transported to a heating device, where a drying step described below is performed, through the transport roller 116.

As the substrate sheet Stc, for example, a belt-shaped sheet formed of polyethylene terephthalate (PET), polytetrafluoroethylene (PTFE), polyethylene naphthalate (PEN), or polyethylene (PE) is used.

A method of applying the catalyst ink to form a catalyst ink layer is not limited to the method using a die coater, and various application devices can be provided in which various application methods such as methods using an applicator, a bar coater, a spray, or the like, screen printing, or gravure printing are used.

In addition, the preparation of the anode catalyst layer sheet to which the catalyst ink is applied is not shown in the drawings but can be performed using the same application device used for the preparation of the cathode catalyst layer. However, in the anode catalyst layer sheet to which the catalyst ink is applied, unlike the cathode catalyst layer which is intermittently formed on the substrate sheet, the non-dried anode catalyst layer is formed on the substrate sheet in a continuously stretched belt shape by applying the anode catalyst ink to the substrate sheet in a continuously stretched belt shape using a die coater.

As in the case of the non-dried cathode catalyst layer sheet Stcp, the anode catalyst layer sheet on which the non-dried anode catalyst layer is formed is transported to the heating device where the drying step is performed.

The non-dried cathode catalyst layer sheet Stcp and the anode catalyst layer sheet are examples of "the substrate sheet to which the catalyst ink is applied" according to the invention.

FIG. 3 is a diagram showing the heating device which is used in Step S200 to Step S400, that is, the step of drying the electrode catalyst layer sheet to the step of performing a heat treatment on the electrode catalyst layer sheet. "DRYING <S200>" of FIG. 3 shows a heating device 200 in the drying step of Step S200 using the cathode catalyst layer sheet as an example, "SOLVENT GAS REMOVAL VERIFICATION <S300>" of FIG. 3 shows the heating device 200 in the verification step of Step S300, and "HEAT TREATMENT <S400>" of FIG. 3 shows the heating device 200 in the heat treatment step of Step S400.

The heating device 200 includes: a first heating unit 200a that is arranged on an upstream side in a direction in which a heating (drying or heat treatment) target is transported; and a second heating unit 200b that is arranged on a downstream side in the transport direction. The first heating unit 200a heats the object, which passes through a chamber of the heating device 200, with air having a preset temperature Ta which is blown from plural inlet ports provided on upper and lower sections of the chamber through which the object passes through. Likewise, the second heating unit 200b heats the object, which passes through the chamber, with air having a preset temperature Tb which is blown from plural inlet ports provided on upper and lower sections of the chamber. Plural exhaust ports (not shown) are provided along the transport direction on side surfaces of the first heating unit 200a and the second heating unit 200b such that gas blown from the inlet ports are exhausted through the exhaust ports. As a result, the exhaust of a solvent gas obtained by gasification of the solvent, which is produced in the drying step described below, can be promoted. The operation of the first and second heating units 200a, 200b is controlled by setting the temperature and air flow rate using a controller (not shown).

The upper inlet ports of the first heating unit 200a are set such that air is blown toward the upstream side in the transport direction. This structure will be described in the description of the heat treatment step described below.

As the heating device 200, various general heating devices can be used in which the object passing through the chamber can be heated to the preset temperature and the preset air flow rate. In this example, a heating furnace including the first and second heating units is used as the heating device 200.

In Step S200 of FIG. 1, the heating device 200 is used as a drying device. Using air having the preset temperature Ta which is blown from the inlet ports, the first heating unit 200a dries the cathode catalyst layer 14cp of the non-dried cathode catalyst layer sheet Stcp passing through the chamber. Likewise, using air having the preset temperature Tb which is blown from the inlet ports, the second heating unit 200b dries the cathode catalyst layer 14cp of the non-dried cathode catalyst layer sheet Stcp passing through the chamber.

Here, the preset temperature Ta of the first heating unit 200a and the preset temperature Tb of the second heating unit 200b are set as a drying temperature Tdr, and the cathode catalyst layer 14cp of the non-dried cathode catalyst layer sheet Step is dried. The drying temperature Tdr is set as a temperature which is lower than a glass transition temperature Tg of the ionomer and at which the ionomer is not thermally decomposed, that is, is set as a temperature which is lower than a threshold temperature Tth at which the ionomer is thermally decomposed. The drying temperature Tdr is set in consideration of the drying time. The threshold temperature Tth can be obtained by measuring a temperature, at which the ionomer used for the catalyst ink is decomposed to produce sulfate ions, in advance through an experiment. For example, the threshold temperature Tth is preferably within a range of 100° C. to 120° C. For example, when a main solvent is ethanol and the threshold temperature Tth is set as 110° C., the drying temperature Tdr can be set to be 70° C. to 90° C. However, the drying temperature Tdr is not limited to the above-described range and can be set as various temperatures based on, for example, the preset threshold temperature Tth, the boiling point of the solvent, and the drying time. The same shall be applied to a case where the main solvent is another solvent.

As described above, in the heating device 200 which functions as the drying device in the drying step of Step S200, the cathode catalyst layer 14cp of the non-dried cathode catalyst layer sheet Stcp is dried, and a cathode catalyst layer sheet Stcd including a dried cathode catalyst layer 14cd is transported from the heating device 200. The dried cathode catalyst layer sheet Stcd transported from the heating device 200 is wound in a roll shape by a winding roller (not shown).

As shown in "SOLVENT GAS REMOVAL VERIFICATION <S300>" of FIG. 3, gas sensors 202a, 202b are provided at the most downstream positions (terminal positions) of the first heating unit 200a and the second heating unit 200b in the chamber of the heating device 200, respectively. A measurement target of the gas sensors 202a, 202b is gas of the main solvent having the highest content in the catalyst ink. For example, when ethanol is used as the main solvent (alcohol) of the catalyst ink, a gas sensor which measures the concentration of ethanol gas is used as the gas sensors 202a, 202b. However, plural as sensors corresponding to plural solvents may be provided in chambers of the respective heating units in order to measure the concentrations of the respective solvent gases. However, it is considered that, since the concentrations of other solvent gases are sufficiently lower than the concentration of the main solvent gas, the concentration of the main solvent gas only has to be measured. In this example, the concentration of ethanol gas is measured, and a gas sensor for ethanol gas is used as the gas sensors 202a, 202b.

In Step S300 of FIG. 1, concentrations Pa, Pb of solvent gases (hereinafter, also referred to as "solvent gas concentrations") remaining after being produced in the drying step of Step S200 are measured by the gas sensors 202a, 202b, and the use of the heating device 200 waits until it is verified that the solvent gas concentrations Pa, Pb are a concentration threshold Pth (ppm) or lower. The concentration threshold Pth is a solvent gas concentration value at which, when the heat treatment described below is performed, the amount of sulfate ions produced by the thermal decomposition of the ionomer is allowable. The concentration threshold Pth can be set by obtaining a relationship between the solvent gas concentration and the amount of sulfate ions, which are produced when the electrode catalyst layer is heated at a heat treatment temperature, in advance through an experiment to obtain a concentration of the solvent gas corresponding to an allowable amount of sulfate ions.

Figure 4:
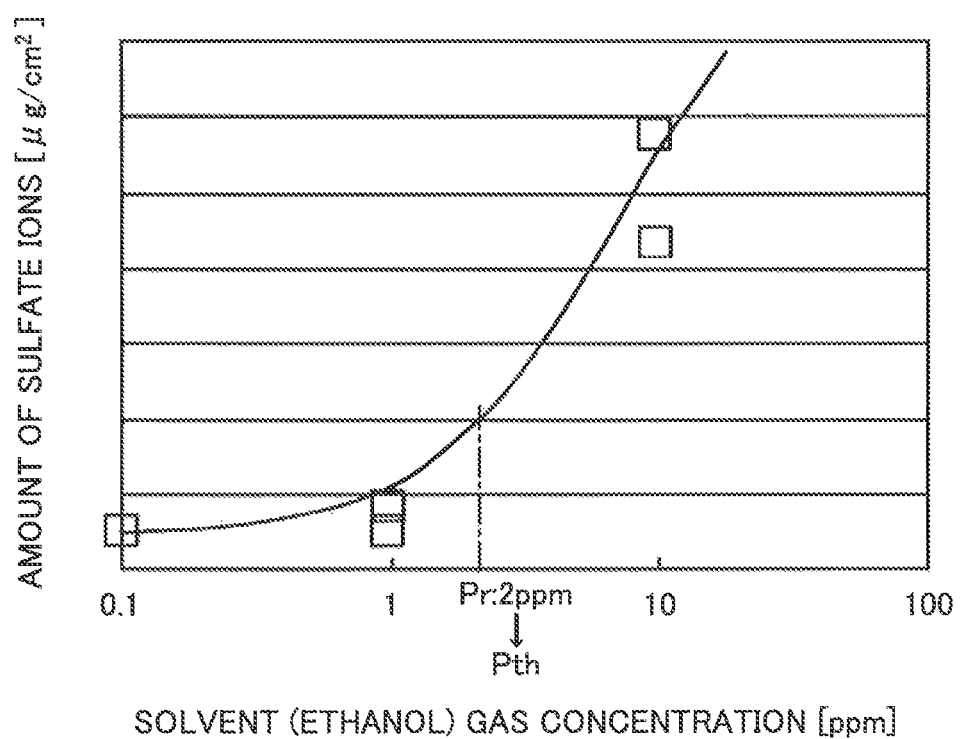
FIG. 4 is a diagram showing an example of a relationship between the concentration of ethanol gas as a solvent gas and the amount of sulfate ions produced by a heat treatment.

FIG. 4 is a diagram showing an example of a relationship between the concentration of ethanol gas as a solvent gas and the amount of sulfate ions produced by a heat treatment. In an example of FIG. 4, when the heat treatment described below is performed on the cathode catalyst layer 14cd in each ethanol gas concentration environment at a heat treatment temperature. Th (in this example, 145° C.) for a heat treatment time Th (in this example, 40 sec), a relationship between the ethanol gas concentration (ppm) and the amount of sulfate ions ($\mu g/cm^2$) contained in the cathode catalyst layer after the heat treatment is shown. The amount of sulfate ions ($\mu g/cm^2$) can be measured, for example, by immersing the heat-treated cathode catalyst layer or a sample thereof with warm water to obtain an extract and analyzing ion components, which are contained in the extract, through ion chromatography. When the amount of sulfate ions is measured based on the sample, the actual amount of sulfate ions in the electrode catalyst layer can be obtained by estimating a value corresponding to the actual area of the electrode catalyst layer.

As shown in FIG. 4, the amount of sulfate ions increases along with an increase in the concentration of ethanol gas (solvent gas). In particular, with a given concentration Pr as a boundary, when the ethanol gas concentration is higher than the concentration Pr, the slope of the increase in the amount of sulfate ions is steep, and when the ethanol gas concentration is the concentration Pr or lower, the slope of the increase in the amount of sulfate ions is gentle. Therefore, it can be seen that, when the ethanol gas concentration is the concentration Pr or lower, the amount of sulfate ions can be suppressed. For example, this concentration Pr may be set as the concentration threshold Pth. In this example, the concentration Pr (in this example, 2 ppm) which is the boundary in FIG. 4 is set as the concentration threshold Pth. However, when the allowable amount of sulfate ions is less than the amount of sulfate ions corresponding to the concentration Pr, the concentration corresponding to the allowable amount of sulfate ions may be set as the concentration threshold Pth. The allowable amount of sulfate ions is preferably 0.5 $\mu g/cm^2$ or less, more preferably 0.3 $\mu g/cm^2$ or less, and still more preferably 0.1 $\mu g/cm^2$ or less. It is preferable that a concentration corresponding to the allowable amount of sulfate ions is set as the concentration threshold Pth.

Regarding the amount of sulfate ions and the concentration threshold, the case where the main solvent is ethanol has been described as an example. However, the same shall be applied to a case where the main solvent is another solvent such as propanol.

In Step S300, when it is verified that the solvent gas concentrations Pa, Pb of the first heating unit 200a and the second heating unit 200b of the heating device 200 are the concentration threshold Pth or lower and that the solvent gas is removed from the chamber of the heating device 200, the heat treatment step of Step S400 is performed by using the heating device 200 as a heat treatment device.

As shown in "HEAT TREATMENT <S400>" of FIG. 3, in the heat treatment step of Step S400, in the heating device 200 which functions as the heat treatment device, the preset temperature Ta of the first heating unit 200a is set as the drying temperature Tdr as in the case of the drying step, and the preset temperature Tb of the second heating unit 200b is set as the heat treatment temperature Th. The heat treatment temperature Th is set as a temperature which is equal to or higher than the glass transition temperature Tg (for example, 120° C. to 140° C.) of the ionomer. However, when the heat treatment temperature Th is excessively high, for example, various materials contained in the electrode catalyst layer may be decomposed. Therefore, it is preferable that the heat treatment temperature Th is about "(glass transition temperature Tg)+50° C.". When the ionomer has a melting point which is equal to or higher than the glass transition temperature Tg, the heat treatment temperature Th may be lower than the melting point. In this example, the heat treatment temperature Th is set as 145° C.

In the first heating unit 200a, as described above, the upper inlet ports are set so as to face the upstream direction. As a result, even if a solvent gas is produced by heating in the first heating unit 200a, the solvent gas can be prevented from flowing in the direction of the second heating unit 200b.

In the heat treatment step of Step S400 of FIG. 1, the dried cathode catalyst layer sheet Stcd, which is wound in Step S200, is placed on the support roller (not shown), is unwound from the support roller the support roller, and is preheated in the first heating unit 200a. Next, in the second heating unit 200b, a heat treatment is performed on the dried cathode catalyst layer sheet Stcd at the heat treatment temperature Th. As a result, a cathode catalyst layer sheet Stch including a heat-treated cathode catalyst layer 14c is transported from the heating device 200. The heat-treated cathode catalyst layer sheet Stch transported from the heating device 200 is wound in a roll shape by a winding roller (not shown). In the step of performing a heat treatment on the electrode catalyst layer sheet, the strength of the structure of the cathode catalyst layer 14c can be improved, transfer defects (also referred to as "peeling defects") such as transfer failure or insufficient transfer, which may occur during transfer described below, can be suppressed. As in the case of the preset temperature Td of the second heating unit 200b, the preset temperature Ta of the first heating unit 200a may be set as the heat treatment temperature Th.

Although not shown in the drawings, similar to the preparation of the cathode catalyst layer sheet, a heat-treated anode catalyst layer sheet can be prepared by causing the anode catalyst layer sheet, which is prepared in Step S100 of FIG. 1, to pass through the steps including the drying step of Step S200 to the heat treatment step of Step S400 using the heating device 200. As a result, as in the case of the cathode catalyst layer sheet, the strength of the structure of the anode catalyst layer can be improved, transfer defects (also referred to as "peeling defects"), which may occur during transfer described below, can be suppressed.

The heat-treated cathode catalyst layer sheet Stch and the anode catalyst layer sheet are examples of "the substrate sheet on which the catalyst ink is dried" according to the invention.

In Step S500 of FIG. 1, the cathode catalyst layer is transferred to one surface of an electrolyte membrane, and the anode catalyst layer is transferred to the other surface of the electrolyte membrane. As a result, a membrane electrode assembly is prepared, in which the cathode catalyst layer is formed on one surface of the electrolyte membrane and the anode catalyst layer is formed on the other surface of the electrolyte membrane. The transfer step of Step S500 is an example of "thermocompression-bonding step" of the invention.

Figure 5:
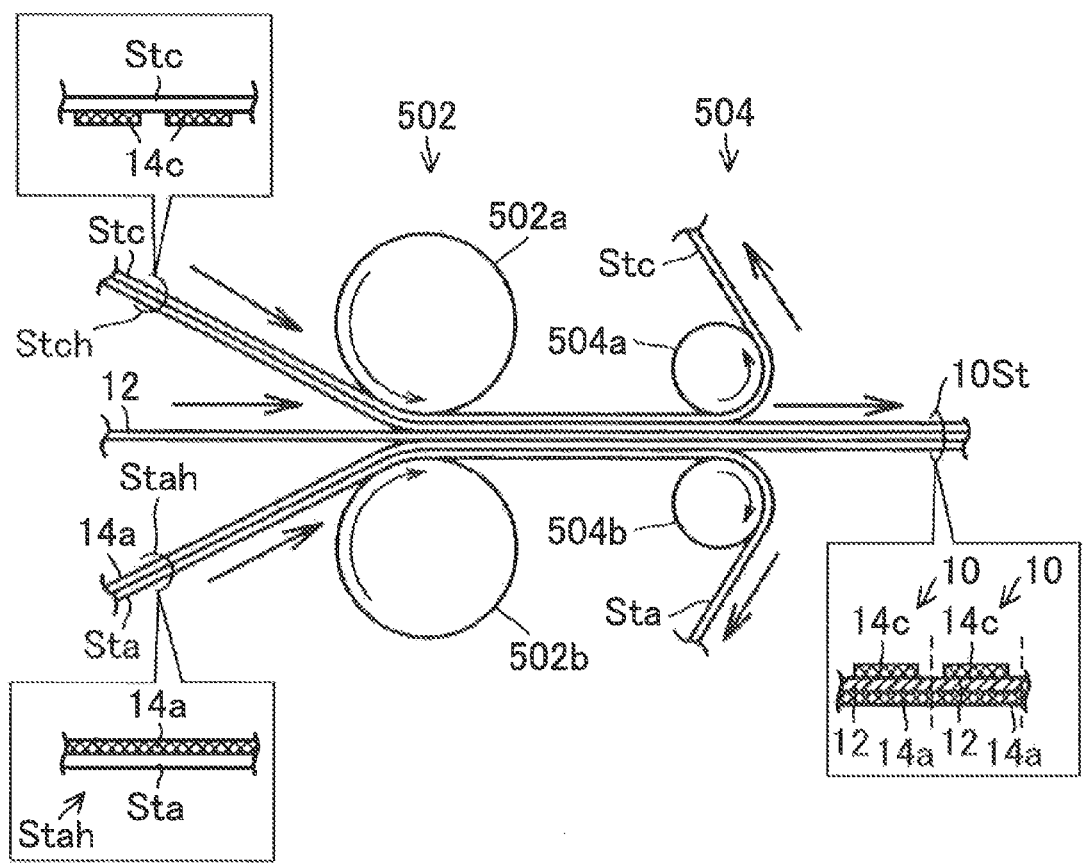
FIG. 5 is a diagram showing an example of a transfer device used for the preparation of a membrane electrode assembly.

FIG. 5 is a diagram showing an example of a transfer device used for the preparation of the membrane electrode assembly. This transfer device 500 includes a heat transfer unit 502 and a peeling unit 504.

The following components are transferred to the heat transfer unit 502, the components including: an electrolyte membrane 12 that is transferred in a state where the membrane surfaces face upward and downward, respectively; the cathode catalyst layer sheet Stch that is transferred in an upper section of the electrolyte membrane 12 in a state where the cathode catalyst layer 14c faces downward; and an anode catalyst layer sheet Stah that is transferred in a lower section of the electrolyte membrane 12 in a state where an anode catalyst layer 14a faces upward. The electrolyte membrane 12, the cathode catalyst layer sheet Stch, and the anode catalyst layer sheet Stah are wound by support rollers (not shown) provided in a roll shape and are supplied to the heat transfer unit 502.

The heat transfer unit 502 includes a pair of heat rollers 502a, 502b that are provided in the upper and lower sections. In the heat rollers 502a, 502b, the cathode catalyst layer 14c of the cathode catalyst layer sheet Stch is placed on an upper surface of the electrolyte membrane 12, the anode catalyst layer 14a of the anode catalyst layer sheet Stah is placed on a lower surface of the electrolyte membrane 12, and the components are bonded to each other. The heat rollers 502a, 502b bonds the cathode catalyst layer 14c to the upper surface of the electrolyte membrane 12 and bonds the anode catalyst layer 14a to the lower surface of the electrolyte membrane 12 through thermocompression bonding.

The peeling unit 504 includes a pair of nip rollers 504a, 504b that are provided in the upper and lower sections. The laminated sheet which has been bonded and transferred from the heat transfer unit 502 is interposed between the nip rollers 504a, 504b, the substrate sheet Stc is peeled off from the cathode catalyst layer sheet Stch by the upper nip roller 504a, and a substrate sheet Sta is peeled off from the anode catalyst layer sheet Stah by the lower nip roller 504b. As a result, the cathode catalyst layer 14e is transferred to the upper surface of the electrolyte membrane 12, and the anode catalyst layer 14a is transferred to the lower surface of the electrolyte membrane 12, thereby preparing a belt-shaped membrane electrode assembly sheet 10St in which the cathode catalyst layer 14c and the anode catalyst layer 14a are formed on both of the surfaces of the electrolyte membrane 12.

The prepared belt-shaped membrane electrode assembly sheet 10st is wound by a winding roller (not shown). As shown by a broken line in FIG. 5, the membrane electrode assembly sheet 10St is cut into a portion including one cathode catalyst layer 14c to prepare one membrane electrode assembly 10.

B. Second Embodiment

A method of manufacturing a membrane electrode assembly according to a second embodiment is basically the same as the method of manufacturing a membrane electrode assembly according to the first embodiment. That is, as shown in FIG. 1, a membrane electrode assembly (MEA) is prepared through the following steps including: a step of preparing an electrode catalyst layer sheet (Step S100); a step of drying the electrode catalyst layer sheet (Step S200); a step of verifying removal of a solvent gas (Step S300); a step of performing a heat treatment on the electrode catalyst layer sheet (Step S400); and a step of transferring the electrode catalyst layer to an electrolyte membrane (Step S500). As described below, different points between the method of manufacturing a membrane electrode assembly according to the second embodiment and the method of manufacturing a membrane electrode assembly according to the first embodiment are as follows: the configuration of a heating device used in the steps including the drying step of Step S200 to the heat treatment step of Step S400; and the details of the treatment which are performed in each step.

FIG. 6 is a diagram showing the heating device which is used in Step S200 to Step S400 in the method of manufacturing a membrane electrode assembly according to the second embodiment, that is, the step of drying the electrode catalyst layer sheet to the step of performing a heat treatment on the electrode catalyst layer sheet. A heating device 200B includes a third heating unit 200c and a fourth heating unit 200d that are provided on a downstream side of the heating device 200 according to the first embodiment and that have the same structure as the first heating unit 200a and the second heating unit 200b.

In the heating device 200B, the drying step (FIG. 1) of Step S200 is performed in the first to third heating units 200a to 200c, the step of verifying removal of a solvent gas (FIG. 1), that is, Step S300 is performed in the third heating unit 200c, and the heat treatment step (FIG. 1) of Step S400 is performed in the fourth heating unit 200d. That is, in the heating device 200B, the non-dried electrode catalyst layer sheet which has been transferred from the application device (not shown) is dried and heat-treated while passing through the chamber of each of the heating units 200a to 200d of the heating device 200B, thereby preparing an electrode catalyst layer sheet on which the heat-treated electrode catalyst layer is formed. The operation of the first to fourth heating units 200a to 200d is controlled by setting the temperature and air flow rate using a controller (not shown). The first and second heating units 200a, 200b are examples of "drying device" according to the invention, the third heating unit 200c is an example of "drying adjusting device" according to the invention, and the fourth heating unit 200d is an example of "heat treatment device" according to the invention.

As in the case of the heating device 200, as the heating device 200B, various general heating devices can be used in which the object passing through the chamber can be heated to the preset temperature at the preset air flow rate, in this example, a heating furnace including the first to fourth heating units is used as the heating device 200B.

In the first and second heating units 200a, 200b, as in the case of the heating device 200 according to the first embodiment, the preset temperatures Ta, Tb are set as a drying temperature Tdr1, and preset air flow rates Va, Vb are set as a drying air flow rate Vdr1, respectively. The drying temperature Tdr1 is the same as the drying temperature Tdr described in the first embodiment and is set to be, for example, within a range of 80° C. to 90° C. which is lower than the threshold temperature Tth (110° C.).

The drying step of Step S200 is performed while measuring the concentration (solvent gas concentration) Pb of the solvent gas (in this example, ethanol gas as in the case of the first embodiment) with the gas sensor 202b provided at the terminal position of the second heating unit 200b.

When the measured solvent gas concentration Pb is higher than the concentration threshold Pth (in this example, 2 ppm as in the case of the first embodiment), the drying of the electrode catalyst layer is insufficient, and the concentration of the solvent gas produced from the electrode catalyst layer (catalyst ink) of the electrode catalyst layer sheet is high, and it is considered that the removal of the solvent from the electrode catalyst layer is insufficient. Therefore, it is necessary that the electrode catalyst layer is sufficiently dried until it reaches the fourth heating unit 200d. Therefore, when the measured solvent gas concentration Ph is higher than the concentration threshold Pth, a preset temperature Tc of the third heating unit 200c is set as a drying temperature Tdr2 which is higher than the drying temperature Tdr1 set as the preset temperatures Ta, Tb, and the preset air flow rate Vc is set as a drying air flow rate Vdr2 which is higher than the drying air flow rate Vdr1 set as the preset air flow rates Va, Vb. As a result, the drying of the electrode catalyst layer sheet passing through the third heating unit 200c is promoted. As in the case of the drying temperature Tdr1, the drying temperature Tdr2 is set to be, for example, within a range of 90° C. to 100° C. which is higher than the drying temperature Tdr1 and lower than the threshold temperature Tth (110° C.).

On the other hand, when the measured solvent gas concentration Pb is the concentration threshold Pth or lower, it is considered that the drying is insufficient. Therefore, the drying conditions in the third heating unit 200c may be maintained to be the same as those in the first and second heating units 200a, 200b by setting the preset temperature Tc of the third heating unit 200c as the drying temperature Tdr1, which is set as the preset temperatures Ta, Tb and setting the preset air flow rate Ye as the drying air flow rate Vdr1 which is set as the preset air flow rates Va, Vb.

The verification step of Step S300 is performed by measuring a solvent gas concentration Pc with a gas sensor 202c provided at a terminal position of the third heating unit 200c which is the final position of the drying step of Step S200. In order to perform the heat treatment step in the fourth heating unit 200d described below in an environment in which the solvent gas concentration is the concentration threshold Pth or lower, it is necessary that the solvent gas concentration Pc measured by the gas sensor 202c is the concentration threshold Pth or lower. That is, it is necessary that the solvent is sufficiently removed from the electrode catalyst layer of the electrode catalyst layer sheet by adjusting the drying in the third heating unit 200c and that the solvent gas produced by the drying is sufficiently exhausted from the chamber of the third heating unit 200c. When it is assumed that the measured solvent gas concentration Pc is higher than the concentration threshold Pth, it can be said that the drying in the first to third heating units 200a to 200c is insufficient and that the removal of the solvent and the exhaust of the solvent gas are insufficient. In this case, it is preferable that the preset temperature Tc and the preset air flow rate Vc of the third heating unit 200c is adjusted to promote the drying such that it can be verified that the measured solvent gas concentration Pc is the concentration threshold Pth or lower. It is also preferable that the preset temperatures Ta, Tb and the preset air flow rates of the first and second heating units 200a, 200b are adjusted to promote the drying in the first to third heating units 200a to 200c such that it can be verified that the solvent gas concentration Pc measured at the terminal position of the third heating unit 200c is lower than the concentration threshold Pth.

The heat treatment step of Step S400 is performed in the fourth heating unit 200d. As in the case of the second heating unit 200b of the heating device 200 according to the first embodiment, in the fourth heating unit 200d, the preset temperature Td is set as the heat treatment temperature Th, and the preset air flow rate Vd is set as a heat treatment air flow rate Vh. The heat treatment temperature Th is set as a temperature which is equal to or higher than the glass transition temperature Tg (for example, 120° C. to 140° C.) of the ionomer and lower than a melting point Tm (for example, 150° C. to 200° C.) of the ionomer. In this example, the heat treatment temperature Th is set as 145° C.

The electrode catalyst layer sheet which has been heat-treated in the fourth heating unit 200d is transported from the heating device 200B and is wound in roll shape by a winding roller (not shown).

In the embodiment, the electrode catalyst layer sheet including the heat-treated electrode catalyst layer can also be prepared by drying the electrode catalyst layer sheet to which the catalyst ink is applied, and performing the heat treatment on the electrode catalyst layer sheet on which the catalyst ink is dried. Using the electrode catalyst layer sheet including the heat-treated electrode catalyst layer, the electrode catalyst layer is transferred to an electrolyte membrane. Thus, a membrane electrode assembly in which the electrode catalyst layer sheet is formed on a surface of the electrolyte membrane can be prepared.

C. Effects

In the manufacturing method according to the first embodiment, by using the heating device as the drying device and the heat treatment device, the electrode catalyst layer is prepared as follows. That is, by using the heating device as the drying device, the electrode catalyst layer sheet, on which the non-dried electrode catalyst layer is formed by applying the catalyst ink, is dried at the drying temperature at which the ionomer is not thermally decomposed. The concentration of the solvent gas remaining in the heating device used for the drying is measured, and the use of the heating device waits until it is verified that the concentration is the preset concentration threshold or lower. After it is verified that the solvent gas concentration is the concentration threshold or lower, by using the heating device as the heat treatment device, in an environment in which the solvent gas concentration is the concentration threshold or lower, the heat treatment is performed on the electrode catalyst layer sheet on which the dried electrode catalyst layer is formed by drying the catalyst ink. As a result, the heat-treated electrode catalyst layer is prepared.

In the manufacturing method according to the second embodiment, by using the heating device in which the drying device, the drying adjusting device, and the heat treatment device are sequentially provided, the electrode catalyst layer is prepared as follows. That is, in the drying device, the electrode catalyst layer sheet, on which the non-dried electrode catalyst layer is formed by applying the catalyst ink, is dried at the drying temperature at which the ionomer is not thermally decomposed. In the drying adjusting device, the drying state of the catalyst ink (non-dried electrode catalyst layer) is adjusted based on the solvent gas concentration measured at a terminal position of the drying device between the drying device and the drying adjusting device such that the solvent gas concentration measured at the terminal position is the concentration threshold or lower. As a result, the removal of the solvent is sufficiently performed, and the exhaust of the solvent gas produced by drying is sufficient. After it is verified that the solvent gas concentration measured at a terminal position of the drying adjusting device is the concentration threshold or lower, in the heat treatment device, in an environment in which the solvent gas concentration is the concentration threshold or lower, the heat treatment is performed on the electrode catalyst layer sheet on which the dried electrode catalyst layer is formed by drying the catalyst ink.

The manufacturing methods according to the first and second embodiments will be summarized below. The substrate sheet to which the catalyst ink is applied is dried at a drying temperature at which the ionomer is not thermally decomposed. Next, in an environment in which the solvent gas concentration is the concentration threshold or lower, the heat treatment is performed on the electrode catalyst layer sheet, on which the catalyst ink is dried, at the heat treatment temperature which is equal to or higher than the glass transition temperature of the ionomer and lower than the melting point of the ionomer. As a result, the electrode catalyst layer is prepared.

In this manufacturing method, the drying is performed at the drying temperature at which the ionomer is not thermally decomposed. Therefore, during the drying, the thermal decomposition of the ionomer can be suppressed. During the heat treatment, the heat treatment is performed in the environment in which the concentration of the solvent gas produced due to oxidation heat, which is generated by the oxidation reaction of the catalyst, is the concentration threshold or lower. Therefore, the thermal decomposition of the ionomer caused by the oxidation heat at the heat treatment temperature can be suppressed. As a result, when the ionomer is a polymer having a sulfonic acid group at a terminal group thereof, the production of sulfate ions, which is caused by the sulfonic acid group being thermally decomposed due to the oxidation heat, can be suppressed.

FIG. 7 is a diagram showing the results of comparing the amounts of sulfate ions contained in electrode catalyst layers of membrane electrode assemblies of Examples 1 and 2, which were respectively prepared using the manufacturing methods according to the first and second embodiments, to that of a membrane electrode assembly of Comparative Example. In a method of manufacturing the membrane electrode assembly of Comparative Example, after the drying step, the heat treatment step was performed in an environment in which the solvent gas concentration is higher than the concentration threshold. Various conditions except for the above-described different point in condition, for example, the composition of the catalyst ink, the drying conditions, and the heat treatment conditions are the same in all of Comparative Example and Examples 1 and 2. As described above using FIG. 4, the amount of sulfate ions was measured, for example, by immersing the prepared electrode catalyst layer with warm water to obtain an extract and analyzing ion components, which are contained in the extract, through ion chromatography.

As can be seen from FIG. 7, in Examples 1 and 2 corresponding to the first and second embodiments, the amounts of sulfate ions were reduced to be 1/10 or lower as compared to the amount of sulfate ions in Comparative Example. Therefore, according to the manufacturing methods of the first and second embodiments, a membrane electrode assembly can be prepared using an electrode catalyst layer in which the production of sulfate ions is suppressed.

By performing the heat treatment on the electrode catalyst layer, the strength of the structure of the electrode catalyst layer can be improved, transfer defects (peeling defects) such as transfer failure or insufficient transfer, which may occur during transfer, can be suppressed.

In the manufacturing method according to the first embodiment, the single heating device is used as the drying device and the heat treatment device. Therefore, the size of manufacturing facilities can be reduced. In the manufacturing method according to the second embodiment, plural heating units constituting the single heating device are used separately as the drying device, the drying adjusting device, and the heat treatment device. Therefore, the size of manufacturing facilities increases, but the manufacturing efficiency can be improved.

D. Modification Example (1) Modification Example 1

In the description of the first and second embodiments, the heat treatment step is performed on both of the cathode catalyst layer sheet and the anode catalyst layer sheet. However, the heat treatment may not be performed on the anode catalyst layer sheet.

(2) Modification Example 2

In the description of the first and second embodiments, the cathode catalyst layer is intermittently formed on the substrate sheet, and the anode catalyst layer is continuously formed on the substrate sheet. However, the anode catalyst layer may be intermittently formed on the substrate sheet, and the cathode catalyst layer may be continuously formed on the substrate sheet.

(3) Modification Example 3

In the description of the example of the second embodiment, the third heating unit 200c as the drying adjusting device is provided in the stage after the first and second heating units 200a, 200b as the drying device; and in the third heating unit 200c, the drying temperature and the drying air flow rate are adjusted based on the drying state in the second heating unit 200b such that it can be verified that the solvent gas concentration measured at the terminal position is the concentration threshold or lower. However, the invention is not limited to this configuration. For example, plural heating units may be provided as the drying adjusting device such that the electrode catalyst layer sheet passes through the plural heating units. In this configuration, while the electrode catalyst layer sheet passes through the drying adjusting device including the plural heating units, it can be verified that the solvent gas concentration measured at the terminal position is the concentration threshold or lower. That is, any configuration may be adopted as long as the heat treatment in the heating units as the heat treatment device is performed in an environment in which the solvent gas concentration is the concentration threshold or lower.

The invention is not limited to the above-described embodiments, Examples, and Modification Examples, and various configurations can be realized within a scope not departing from the scope of the invention. For example, in order to solve some or all of the above-described problems, or to achieve some or all of the above-described effects, the technical features in the embodiments, Examples, and Modification Example corresponding to the technical features in the respective aspects described in "SUMMARY OF THE INVENTION" can be appropriately replaced or combined with each other. Moreover, unless specified as essential features in this specification, the technical features can be appropriately removed.

What is claim is:

1. A method of manufacturing a membrane electrode assembly in which an electrode catalyst layer is formed on a surface of an electrolyte membrane, the method comprising:
    drying a substrate sheet to which a catalyst ink is applied, the catalyst ink containing catalyst support particles on which a catalytic metal is supported, a solvent, and an ionomer;
    reducing a concentration of a solvent gas obtained by gasification of the solvent, which remains in a chamber of a heating device for performing a heat treatment, to a predetermined concentration threshold or lower;
    performing the heat treatment on the substrate sheet, on which the catalyst ink is dried, after the drying and after the concentration of the solvent gas is at the predetermined concentration threshold or lower, wherein the heat treatment is performed at a heat treatment temperature which is equal to or higher than a glass transition temperature of the ionomer to prepare the electrode catalyst layer; and
    bonding the prepared electrode catalyst layer to the electrolyte membrane through thermocompression bonding to prepare the membrane electrode assembly.

2. The method according to claim 1, wherein
    during the heat treatment, a concentration of the solvent gas, which remains in a chamber of the heating device used for the drying, is measured after the drying, and
    after it is verified that the measured concentration of the solvent gas is the concentration threshold or lower, the heat treatment is performed using the heating device in which the concentration of the solvent gas is the concentration threshold or lower.

3. The method according to claim 1, wherein
    the heating device includes a drying device for the drying, a heat treatment device for the heat treatment, and a drying adjusting device arranged between the drying device and the heat treatment device,
    the drying is performed by the drying device during the heat treatment,
    a drying state of the catalyst ink is adjusted by the drying adjusting device based on the concentration of the solvent gas at a terminal position in a chamber of the drying device, and
    the heat treatment is performed by the heat treatment device after it is verified that the concentration of the solvent gas at a terminal position in a chamber of the drying adjusting device is the concentration threshold or lower.

4. The method according to claim 1, wherein
    during the drying, a drying temperature is set as a temperature which is lower than a glass transition temperature of the ionomer and lower than a threshold temperature at which the ionomer is thermally decomposed.

5. The method according to claim 1, wherein
the concentration threshold is set by obtaining a relationship between the concentration of the solvent gas and an amount of sulfate ions, which are produced when the electrode catalyst layer is heated at the heat treatment temperature, in advance through an experiment to obtain a concentration of the solvent gas corresponding to an allowable amount of sulfate ions.

* * * * *